May 3, 1960 W. T. GRAHAM 2,935,148
SPRING CLAMP WITH LIMITED SPRING COMPRESSION
Filed March 26, 1956 4 Sheets-Sheet 1
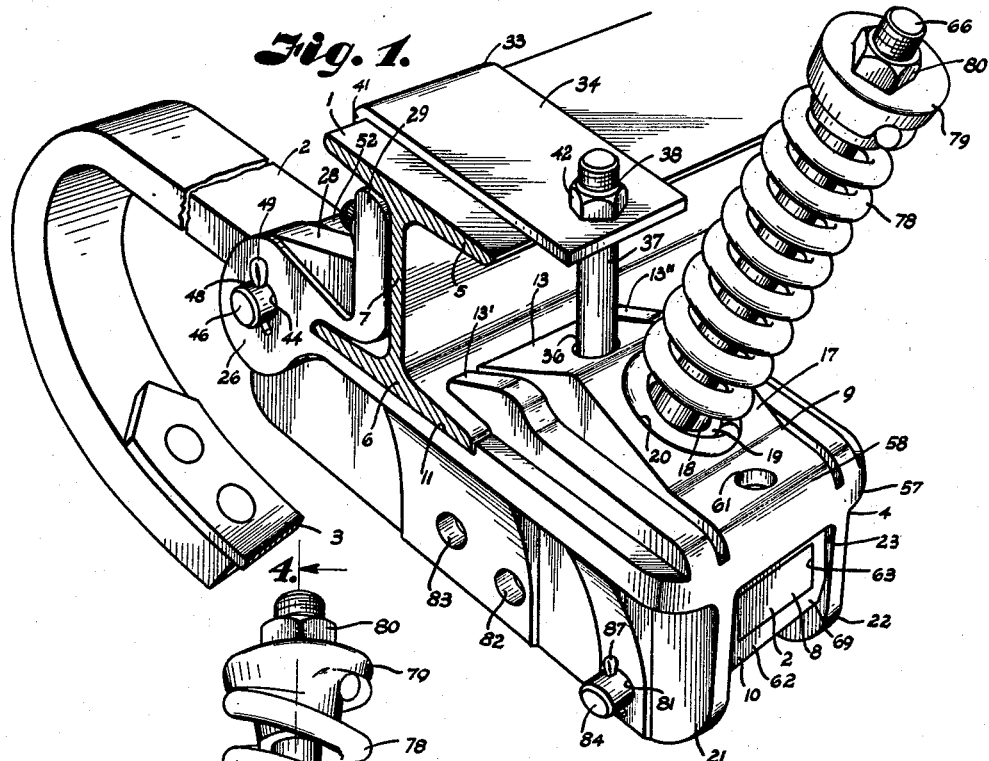
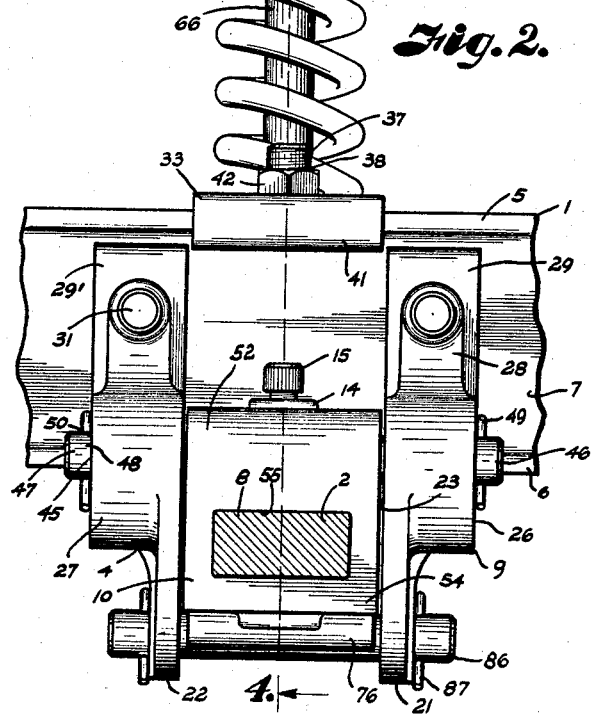
INVENTOR.
William T. Graham.
BY
Fishburn and Gold
ATTORNEYS.

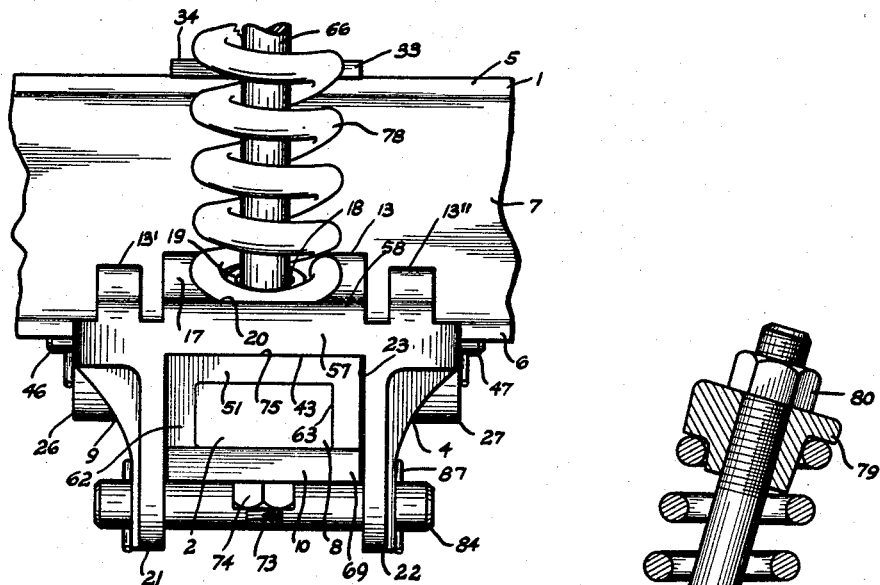
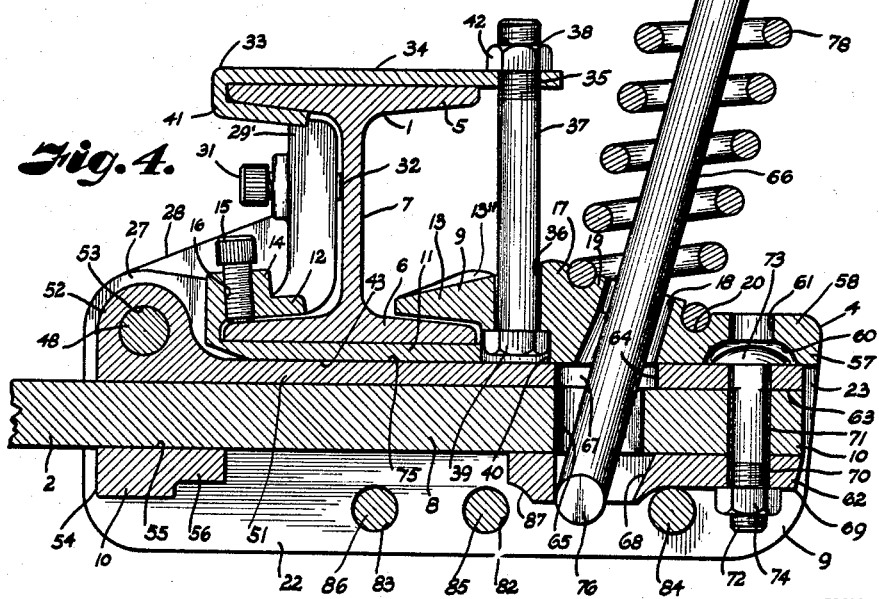

May 3, 1960 W. T. GRAHAM 2,935,148
SPRING CLAMP WITH LIMITED SPRING COMPRESSION
Filed March 26, 1956 4 Sheets-Sheet 3
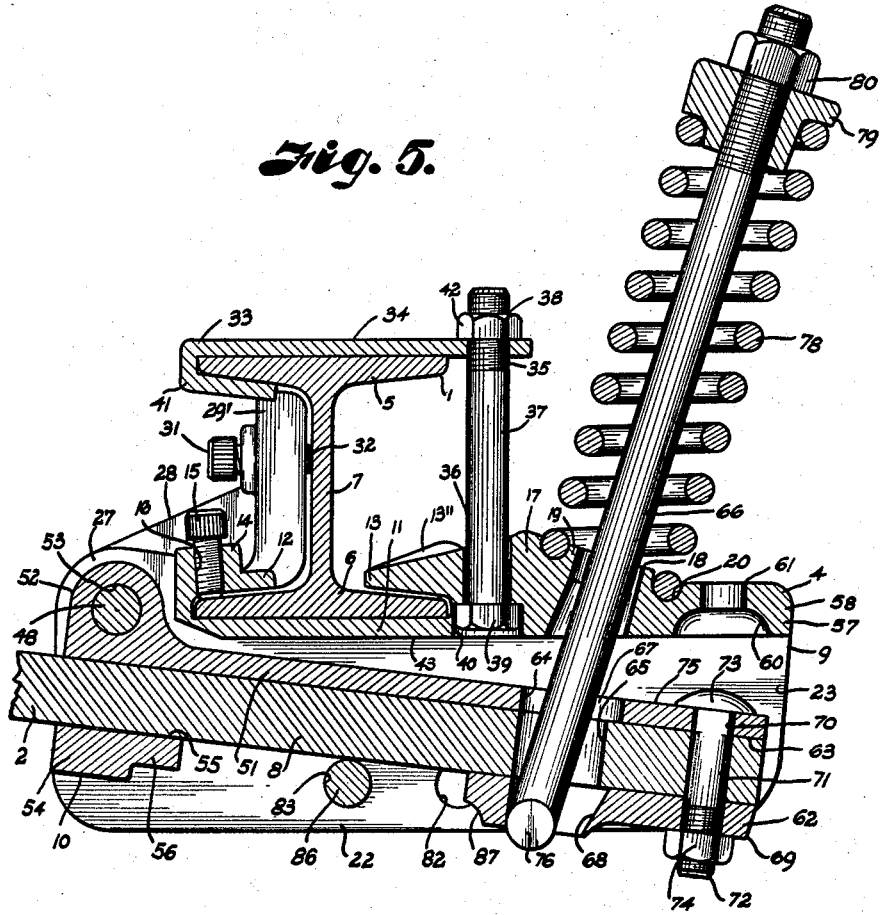
Fig. 5.
Fig. 6.
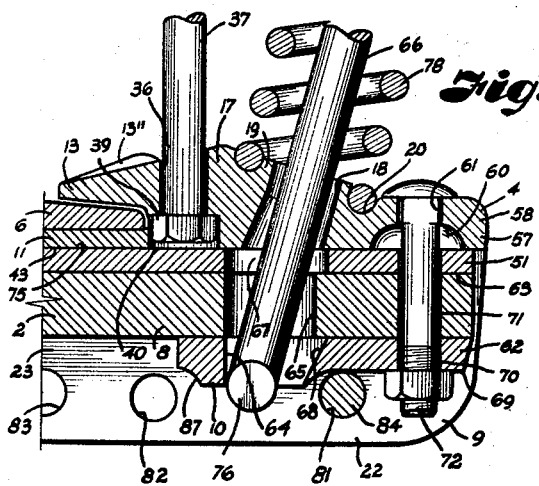
INVENTOR.
William T. Graham.
BY
ATTORNEYS.

May 3, 1960 W. T. GRAHAM 2,935,148
SPRING CLAMP WITH LIMITED SPRING COMPRESSION
Filed March 26, 1956 4 Sheets-Sheet 4

INVENTOR.
William T. Graham.
BY
ATTORNEYS.

United States Patent Office 2,935,148
Patented May 3, 1960

2,935,148

SPRING CLAMP WITH LIMITED SPRING COMPRESSION

William T. Graham, Amarillo, Tex.

Application March 26, 1956, Serial No. 573,663

1 Claim. (Cl. 172—710)

This invention relates to a plow of a type including ground conditioning tools that are carried on shanks having support on a mobile frame and which work under the surface to heave and break the soil and form alternate ridges and furrows having exposed surfaces composed of clods which normally move to the top of the ground and the loose dirt settling to the bottom of the furrows and the sod, straw and other mulching material remaining on top of the ground.

Plows of this character have proven most efficient in dry territories, the plow conditioning the ground for optimum moisture conservation and preventing erosion by water and wind. The mulching material on top of the ridges and furrows will prevent drying out of the soil and crusting thereof due to protection from the wind and the sun by such mulching material. Use of the plow has proven that very increased yield in crops are obtained by use of such a plow over the mold board type of plow.

The plow is made more effective by providing a pronounced vibratory action of the ground working tools, the action working the fine soil towards the bottom for forming the seed bed and the coarse material to the top for forming a better mulch and moisture collecting surface.

The plows have been very successful in territories where the fields contain rocks and other obstructions some of which are underneath the surface of the ground. In such conditions it is desirable to mount the shanks of the ground working tools for rocking movement on the frame of the plow so that the ground working tool will pass freely over or around the obstructions and return to normal plowing position without injury to the plow.

The present invention is an improvement over Patents Nos. 2,493,811, 2,627,798 and 2,712,780.

It is the object of the present invention to provide a simple and reliable mounting for attaching the shanks of the ground working tool to the mobile frame whereby the shanks may rock when necessary and vibrate under action when the plow is working in rocky or heavy soil; to provide a device of this character whereby springs are mounted on the mounting for exerting tension on the forward end of the shank to hold it in normal position with the forward end of the shank against the mounting until the pressure on the point of the ground working tool on the other end of the shank overcomes the tension of the spring to move the shank away from the mounting, and to provide means to limit compression of the springs to prolong the life thereof.

It is also an object of the invention to provide a mounting which includes a fixed part and a movable part pivotally connected with the fixed part and having a shank attaching portion to which the shank is secured and resiliently retained on the fixed part.

A still further object of the invention is to provide means on the mounting for controlling the compression of the spring to a desired degree; to provide means for securing the shank directly to the fixed member at the forward end thereof so that the spring will not be in operation, and to provide a device of this character simple and economical to manufacture.

In accomplishing these and other objects of the invention I have provided improved structure, the preferred form of which is illustrated in the accompanying drawings, wherein;

Fig. 1 is a fragmentary sectional view through a frame member of a plow showing a mounting constructed in accordance with the present invention for resiliently attaching the shank to the ground working tools whereby the shanks are adapted to rock relative to the frame when passing over an obstruction and return to normal position after the obstruction has been passed.

Fig. 2 is an end view with the shank being shown in cross section.

Fig. 3 is a front view of the structure disclosed in Fig. 1.

Fig. 4 is a longitudinal section through the frame member, the plow shank and the mounting by which the shank is pivotally connected with the frame member and resiliently held in normal plowing position, the section being taken on the line 4—4 of Fig. 2.

Fig. 5 is a longitudinal section similar to Fig. 4 but showing the shank and movable part of the mounting rocked relative to the fixed part of the mounting with the rear locking pin placed to limit compression of the spring.

Fig. 6 is a longitudinal section through the front part of the plow shank and the mounting by which the shank is pivotally connected with the frame member and showing the bolt at the forward end for securing the shank relative to the fixed member.

Figure 7:
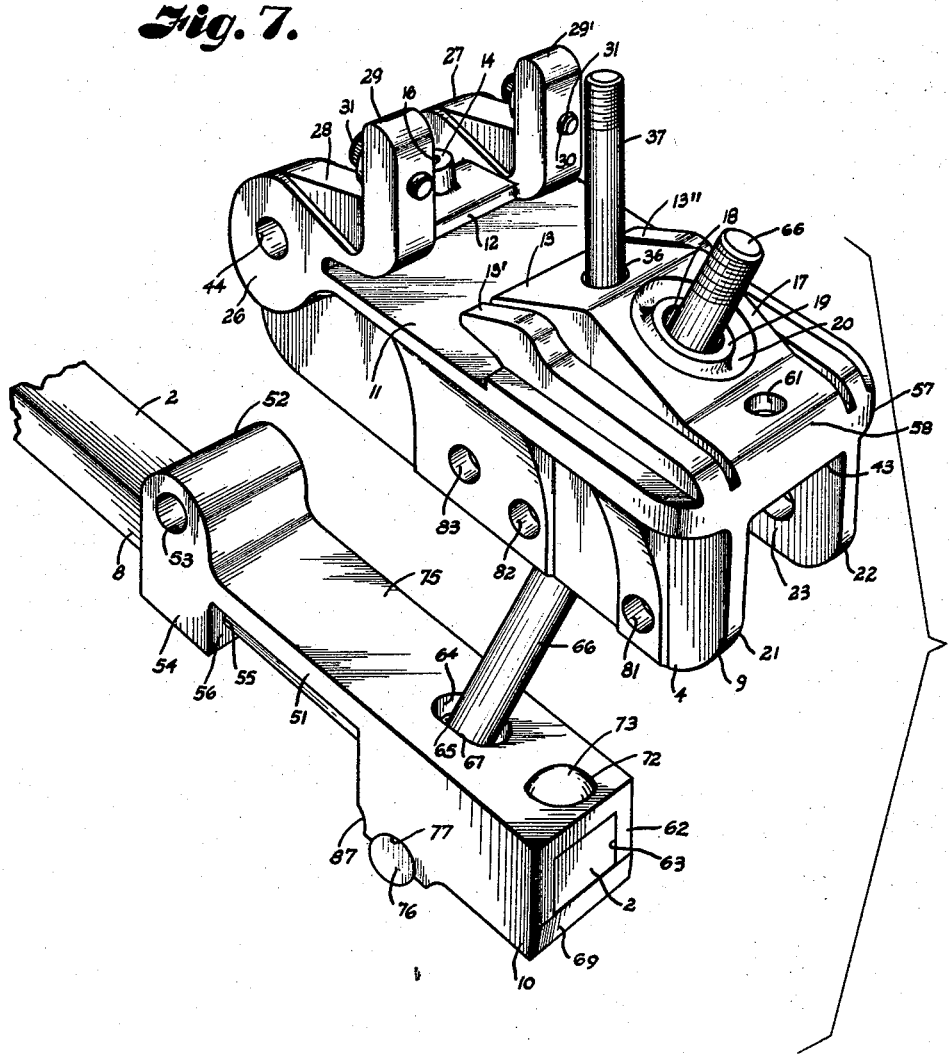
Fig. 7 is a perspective view of the parts shown in disconnected and spaced relation to better illustrate the construction thereof.

Referring more in detail to the drawings.

1 designates the part of the plow frame to which the shanks 2 of the ground working tools 3 are attached by mountings generally indicated 4. All of the tool, shank and mounting assemblies are of like construction and only one is illustrated and described. It will be understood that the plow may include one or more of the ground working devices.

The frame member 1 comprising a part of the plow frame is illustrated as comprising an I-beam having upper and lower horizontally arranged flanges 5 and 6 that are interconnected by a vertical web 7. The shank 2 is formed of metal bar stock the same as described in Patent No. 2,627,798, a straight end portion of the shank, indicated at 8, extends transversely with respect to the frame member 1 and is adapted to rock longitudinally relatively to travel of the plow.

Each mounting 4 includes a fixed part 9 and a movable part 10. The fixed part 9 has a substantially flat plate portion 11 of a length substantially the width of the lower flange 6 of the I-beam and which is closely engaged therewith by flanges 12 and 13, 13' and 13", extending over the upper face of the lower flange 6 as best illustrated in Fig. 1. The flange 12 carries a boss 14 for a set screw 15 which has its shank threaded in an opening 16 which extends through the boss and flange 12 to engage the upper face of the flange 6 and draw the plate portion 11 of the fixed part in engagement with the lower face of the flange 6 and insure a firm connection with the I-beam.

Extending forwardly from the plate portion 11 and flange 13 is a relatively thicker extension 17 provided with a slot like opening 18 extending through a boss 19 which forms a spring seat 20. The slot like opening 18 extends through the forwardly extending portion of the fixed member at an angle for a purpose later described.

The fixed part 9 has depending sides 21 and 22 throughout the length of the fixed member spaced apart to form a downwardly opening channel or way 23 therebetween and in which the movable part 10 of the mounting is adapted to rock along with the forward end portion 8 of the shank 2.

Extending rearwardly from the spaced flanges or side members 21 and 22 are ears 26 and 27 that extend upwardly over the flange 12 and carry webs 28 that support abutments 29 and 29' which engage the rear face of the I-beam web 7 for distributing forces acting on the shank to the upper portion of the I-beam. The abutments 29 and 29' are provided with threaded openings 30 for receiving a set screw or the like 31 for holding the abutment in adjusted position against the web 7 due to the end 32 thereof engaging thereagainst.

The mounting further includes a hooked member 33 having a plate portion 34 that extends over the upper face of the I-beam and flange 5 which has an opening 35 aligning with opening 36 in the forward extension of the fixed part to pass the shank 37 of a bolt 38, the head 39 of the bolt being countersunk within a recess 40 that is formed on the underface of the extension 17 as best shown in Fig. 4. The opposite end of the plate portion 34 has a downwardly and forwardly extending hook 41 that engages under the upper flange of the I-beam. The bolt 38 has a nut 42 threaded on the shank thereof to draw the parts tightly against the I-beam, as shown in Figs. 1 and 4.

The ears 26 and 27 are provided above the level of the under face 43 of the plate portion 11 with registering openings 44 and 45 to mount the ends 46 and 47 of a transverse pin 48, the pin being retained in position by cotter pins 49 extending through suitable openings 50 in the projecting ends of the pin.

The movable part 10 includes an elongated plate portion 51 having a width to move freely within the channel or way 23 and the rear end has an upwardly extending transverse ear 52 that is provided with an opening 53 for passing the pin 48 to pivotally connect the movable part 10 with the fixed part 9. The movable part also includes a depending elongated loop 54 having a rectangular passage way 55 substantially conforming to the cross-sectional shape of the end portion of the shank whereby the end portion 8 of the shank is passed therethrough and embraced by the elongated loop or box portion to rock with the movable part on the pivot pin 48. The under side of the stirrup portion of the movable part has a rib 56 as best illustrated in Fig. 2 to lend additional support to the shank.

The fixed member 9 has an additional extension 57 forwardly of the extension 17 and is thickened as indicated 58. The underneath face of the forwardly extension 57 of the fixed member 9 is provided with a depression or socket 60 having an opening or throat 61 extending to the edge thereof. The plate portion 51 of the movable member 10 extends forwardly substantially to the forward portion of the extension 57 of the fixed member and includes an elongated depending loop 62 having a rectangular passage way 63 substantially conforming to the cross sectional shape of the end portion of the shank whereby the end portion of the shank is extended therethrough and embraced by the looped portion. The looped or box portion 62 of the forward end of the plate 51 includes an elongated opening 64 that registers with an opening 65 in the shank 8 spaced rearwardly from the end thereof to pass a fastening device or rod 66. A portion of the slot 64 has straight side edges as indicated at 67 and the lower slot in the lower portion of the loop member is angled as indicated at 68 spaced forwardly from the opening 64 through the loop portion of the plate of the movable member. Spaced from the end 69 of the movable part 10 is an opening 70 registering with an opening 71 in the end of the shank 8 accommodating a bolt 72 having a head 73 fitting within the socket 60 of the extension 57 of the fixed member. The bolt has a threaded end for receiving a threaded nut 74 for fastening the shank and looped end of the plate of the movable member together. Tightening of the nut 74 of the bolt will not tighten the end of the shank in the passageway in the end of the plate, thus permitting slight longitudinal movement of the end portion of the shank relatively to the pivotal part of the clamp due to the opening 71 in the end of the shank being slightly larger than the bolt 72.

The plow shank and movable part 10 of the mounting are resiliently retained in normal position with the upper face 75 of the plate portion of the movable member in clamping engagement with the under face 43 of the fixed part 11. The rod 66 extends through the registering opening 18 of the extension 17 of the fixed member through the opening 64 in the forward end of the plate member 51 and the opening 65 of the shank 8 and has a transverse head 76 at its lower end engaging in a transverse groove portion 77 of the under side of the looped portion 62 of the movable plate member. Sleeved over the rod 66 and having one end engaging the spring seat 20 is a coil spring 78 having its upper end connected with the upper end of the rod by a washer like spring seat 79 retained on the upper end of the rod by nut 80, the nut being tightened on the rod to compress the spring 78 sufficiently to retain the shank 2 and movable part 10 in normal position but to allow rocking movement of the movable part when the shank is rocked. This rocking movement of the shank will cause the movable part 10 to pivot away from the fixed part 11 along with the forward end portion 8 of the shank 2 as shown in Fig. 5 to effect compression of the spring 66 so that the stored up action in the spring will return the shank and the movable part of the clamp to normal position with the plate portion 51 resiliently held against the fixed part 11 of the mounting as shown in Fig. 4.

The construction now about to be described provides a dual function for the mounting of the shank to the plow frame and for rendering the spring inactive during operation if desired. Heretofore when the shanks were desired to operate without resilient mounting the shanks were secured to the I-beams of the frame by what is commonly known as a solid clamp structure and if it was desired to have a resilient mounting different clamps were provided on different plows. With my present invention the one clamp may be utilized for either solid clamping of the shank to the plow frame or a resilient mounting.

The depending sides 21 and 22 of the fixed member 9 are provided with spaced aligned openings 81, 82 and 83 for accommodating a pin 84, 85 and 86. In Fig. 6 it will be observed that the bolt 72 is of a length which may be inserted through the opening 61 of the extension of the bracket 9 to secure and lock the pivoted member 10 and shank 2 to the bracket 9. In addition thereto when the pin 84 is inserted in the opening 81 it will provide additional locking of the shank to the fixed member to render the spring 78 inoperative. When it is desired to have the spring in operative position the bolt 72 may be secured to the plate 51 of the movable member and shank only and the pin 84 removed in which instance the pin 85 will act as a stop against the curved portion 87 of the lower rear portion of the loop member 62. This limits compression of the spring to approximately 1¼ inches. When it is desired to have further compression of the spring the pin 85 is also removed and the pin 86 will then limit compression of the spring until the shank 8 rests against the pin 86 as shown in Fig. 5 in which event the spring will be compressed to approximately 2½ inches. With this form of the invention the spring is never fully compressed and the life is therefore prolonged.

The assembly of the mounting is the same as that described in my Patent No. 2,627,798.

When the mounting or clamp is in position so that the springs are operative and the plow is in operation the ground working tool 3 may engage an obstruction, and the tool is free to ride over the top of the obstruction upon upward rocking movement of the shank. The shank moves with the movable part 10 of the mounting about the axis of the pivot pin 48 so that the forward end 8 of the shank moves downwardly to cause the rod 66 to further compress the spring 78 whereby the spring is enabled to return the shank 2 and movable part 10 to their normal positions after the ground working tool has passed over the obstruction. With the pin 85 in position the compression of the spring will be limited to approximately 1¼ inches and with the pin 85 removed and 86 in place the compression of the spring will be greater. The pins 84, 85 and 86 are held in place by cotter keys 87 through openings in the respective ends thereof.

When the mounting is desired to be used as a solid clamp then the pin 84 is inserted through the opening 81 so that the forward end of the shank 8 is held in contact with the fixed member and the bolt 72 may also be inserted through the opening 61 in the extension 57 of the fixed or bracket member and through the forward end of the plate 51 and the shank 8 to make a substantially solid structure. When in operation with the clamp in this position there will be no vibratory action other than that inherent in the shank itself, Fig. 6.

It will be noted the boss 19 surrounding the opening 18 in the extension 17 of the fixed member is at an angle with the rod 66 which also extends at an angle with respect to the vertical so that there will be more of a straight downward pull when the spring is compressing due to movement of the forward end of the shank 8 away from the fixed member, and thus eliminate a tendency of the rod to be pulled backwardly against the bracket member immediately upon compression of the spring.

It will be obvious from the foregoing that I have provided a new and improved mounting for a plow having ground working tools attached to the plow frame to permit the desired rocking action of the plow shank and to limit compression of the spring thereon without producing destructive strains on the spring and also for providing the springs inoperative when the plow is used in loose ground where the springs are not necessary for rocking of the shank.

What I claim and desire to secure by Letters Patent is:

In a plow having a frame and a ground working tool provided with a shank adapted to rock relatively to the frame when the plow is in operation in a forward direction, a mounting for pivotally attaching and supporting the shank of the ground working tool to a transverse member of the frame, the mounting including a fixed member adapted to be fixed to the transverse member of the frame, spaced depending flanges defining a downwardly opening unobstructed way extending in fore and aft direction of the plow, said fixed member having a longitudinally extending underface between said depending flanges and extending forwardly of the transverse member to which said mounting is adapted to be fixed, a shank attaching member having an elongated plate portion provided with an upper face in contact with said underface of the fixed member and provided with a longitudinally extending underface in engagement with a corresponding upper face of the shank whereby the plate portion of the shank attaching member is between the shank and the fixed member, means connecting the elongated plate portion with the shank for maintaining the upper face of the shank in contact with the underface of said plate portion of the shank attaching member, a transverse pin pivotally connecting the shank attaching member to the fixed member at the rear ends of said normally contacting faces and whereon the shank attaching member has up and down swinging movement in said downwardly opening way about the axis of said transverse pin with downward swinging movement of the forward end of the shank attaching member increasing tilt of the ground working tool relative to the ground, a coil spring having one end seated on the forward end of the fixed member, means having connection with the forward end of the shank and with the other end of the coil spring whereby the spring yieldably urges the upper face of the plate portion of the shank attaching member into contact with the underface of the fixed member and permits downward swinging movement as the moment of force from resistance to moving the tool through the ground overcomes the moment of force exerted by the spring on said shank attaching member, said depending flanges extending below the shank attaching member and having pairs of spaced aligned openings extending therethrough below said shank attaching member, said pairs of openings having different spacing forwardly of said transverse pivot pin, and a pin selectively engaging in one of said pairs of openings in said depending flanges for engagement by the forward portion of said shank attaching member and shank in the swinging movement thereof to provide a lower limit to said swinging movement and the resulting tilt of the ground working tool.

References Cited in the file of this patent

UNITED STATES PATENTS

| 264,319 | Mendenhall | Sept. 12, 1882 |
| 404,845 | Kissell | June 11, 1889 |
| 2,493,811 | Graham | Jan. 10, 1950 |
| 2,627,798 | Graham | Feb. 10, 1953 |
| 2,712,780 | Graham | July 12, 1955 |

FOREIGN PATENTS

| 253,298 | Great Britain | June 17, 1926 |
| 269,394 | Great Britain | Apr. 21, 1927 |